May 15, 1923.
F. W. JACKSON
AUTOMOBILE TOOL
Filed July 20, 1921
1,455,617
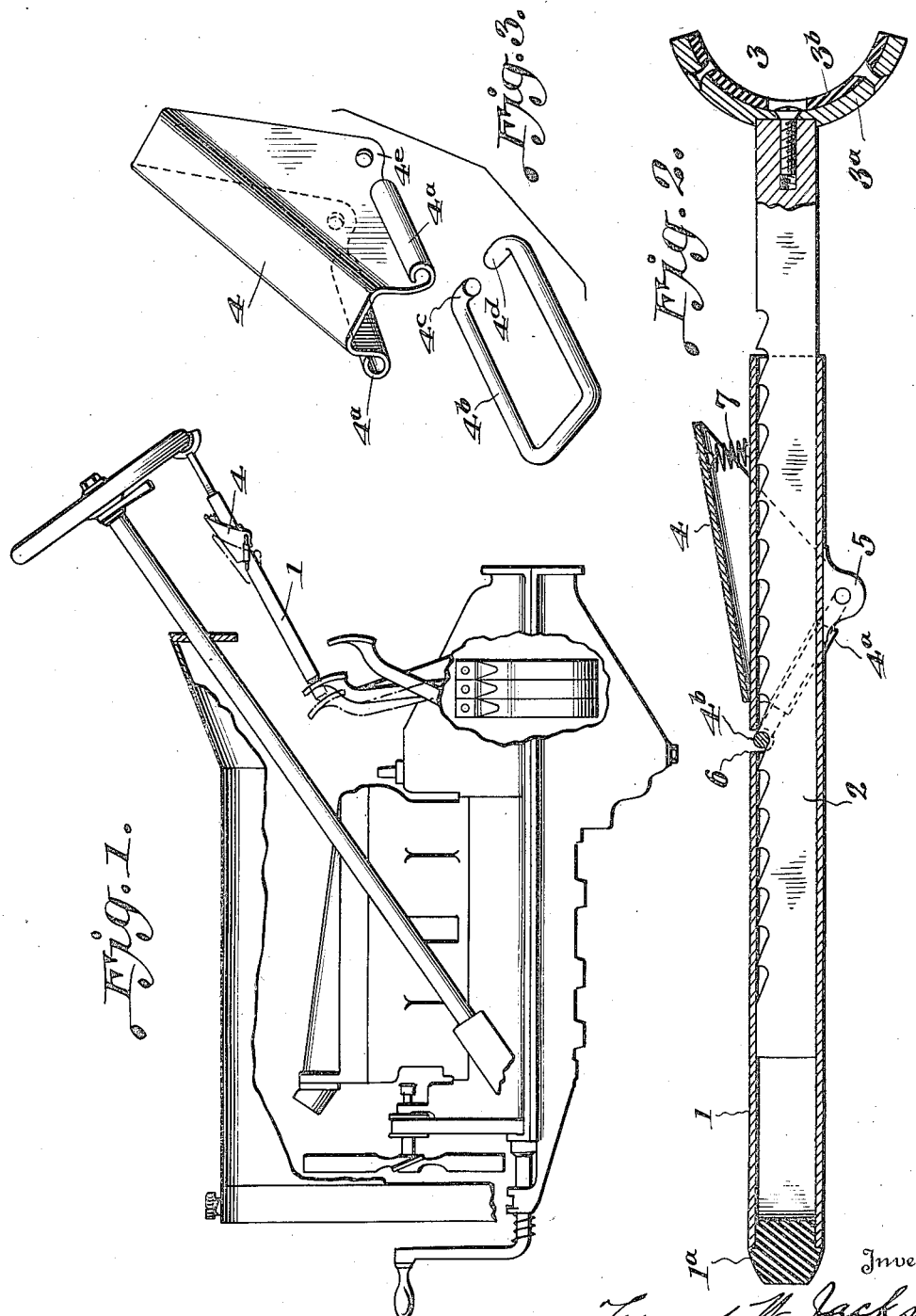

Patented May 15, 1923.

1,455,617

UNITED STATES PATENT OFFICE.

FRANK W. JACKSON, OF TOMPKINSVILLE, NEW YORK.

AUTOMOBILE TOOL.

Application filed July 20, 1921. Serial No. 486,305.

*To all whom it may concern:*

Be it known that I, FRANK W. JACKSON, a citizen of the United States, residing at Tompkinsville, in the county of Richmond and State of New York, have invented certain new and useful Improvements in Automobile Tools, of which the following is a specification.

This invention relates to improvements in appliances adapted especially for use in connection with automobiles and motor-vehicles in making repairs or readjustments particularly of the brakes, clutches, etc.

The invention has for its object, among other purposes, principally to provide for obtaining the proper spring brake pressure also the equalizing of such pressure, and the adjustment of the spring pressure of the clutch; with these conditions met liability of skidding is reduced to the minimum.

A further object is to provide for the holding of the clutch in any required functioning position, and adapting it for general application whereby less manual assistance and consequently labor and expense, are required therefor.

A still further object is to provide for carrying out the aforesaid purposes in a simple, ready, effective and inexpensive manner and with facility.

Other objects, together with the foregoing, will be apparent from the following description of the construction and arrangement of my invention.

The invention therefore consists of certain instrumentalities and features of construction substantially as hereinafter more fully disclosed and defined by the appended claims.

The accompanying drawing illustrates the preferred embodimet of my invention, or one form thereof, wherein it will be understood that various changes and modifications as relate to the detailed construction and arrangement of parts may be made without departing from the spirit or scope thereof as covered by the claims, and in which drawing—

Fig. 1 is a skeletonized view of an automobile with my invention shown applied thereto.

Fig. 2 is a longitudinal sectional view showing the rack in elevation.

Fig. 3 is a detail perspective view of the pawl.

In carrying out my invention I employ a tubular member or casing 1 preferably quadrangular in transverse section and within this tubular member or casing is slidably, telescopically or adjustably arranged a rack or ratchet 2, of corresponding transverse section, these being of such longitudinal areas or lengths as to allow of the graduated adjusting or projecting of the member 2 with respect to the member 1, the purpose of which will be presently made apparent. The member or ratchet 2 is provided at one end with a preferably arcuate appliance 3, which may be termed, more specifically, as a rest or yoke preferably formed of a metallic base $3^a$ screwed or otherwise suitably secured together with a leather or pliable lining or cushion $3^b$ therefor, centrally to one end of the member 2, for the ready reception and retention in position at the rim or periphery of the steering wheel of an automobile or machine, for instance, for using the tool or device in repairing the latter or otherwise giving it attention as will more fully appear presently. The member 1 has that end thereof distant from the end of the member 2 having the rest or yoke 3, provided with a preferably rubber plug, block or foot $1^a$ adapted to engage or cause to rest upon the brake-pedal of the machine, as shown, with the yoke or rest 3 of the member 2 is positioned in contact with the steering wheel rim, as above described. In effecting the operation of adjusting the pressure or compressive action of the brake spring, as practiced by my invention reaching that end, the ratchet member 2 is properly actuated or adjusted, as presently indicated, so as to force the plug-equipped or non-slipping end $1^a$ of the member 1 forwardly and downwardly upon the steering wheel brake pedal the required graduated extent, the upper end of the tool, as at 3, being brought against the lowest position of the rim or periphery of the steering wheel, in elevated or inverted position, the parts will be thus disposed for the proper tensioning or readjustment of the spring pressure of the brake by suitably taking up the brake spring tension relaxation, thereby accordingly providing for remedying any defective action which would otherwise exist therein and thus restore the spring pressure of the brake to its usual or full effectiveness.

A preferably approximately triangular tubular member 4, rectangular in transverse section, functioning as a detent or pawl, is adapted to receive and provide for the passage of the tubular member 1 longitudinally therethrough and has its lower inclined edge preferably rolled into narrow tubes 4ª receiving the lateral portions of an approximately link-shaped frame 4ᵇ having its transverse end portions 4ᶜ, 4ᵈ, one passed through the angular portions 4ᵉ of the member 4 and through a fulcrum or bearing 5 brazed upon, or formed integrally with said member 4, the other end portion of said frame or link 4ᵇ being let into a transverse slot 6 formed in the member 1, in providing for its engagement with the ratchet 2. The pawl-functioning portion 4, by the action of which the retention and release of the ratchet 2, respectively, is effected, is held in normally retained position by means of a spring 7 suitably secured to the members 1 and 4. The plug 1ª attached to the bottom end of the member 1 provides against the accidental slipping of the tool from its position when in use.

It will also be observed that, as previously stated, my invention is equally adapted for functioning in readjusting or remedying defects or relaxing of the spring pressure of clutches in this type of machines, also adapted for replacing and repairing other parts of the clutch as also of the brake mechanism.

Having thus described my invention what I claim as new and desire to secure by Letters Patent is:

1. An automobile repair tool comprising a tubular member adapted to serve as a support, a ratchet member telescoping the tubular member and having a yoke at one end adapted to receive a steering wheel rim or periphery, said tubular member or support adapted to engage or bear upon a pedal and a spring-controlled member fulcrumed upon said support and equipped with an appliance carried by tubular formations on said ratchet support and adapted to engage said ratchet.

2. An automobile repair tool comprising a tubular support, one end adapted to engage a brake or clutch pedal, a ratchet carried by said support and having a yoke adapted to receive the rim of the steering wheel, a spring-controlled member fulcrumed upon said support, and a frame carried by said spring-controlled member and adapted to engage said ratchet.

3. An automobile repair tool, comprising a tubular member having one end adapted to engage a brake or clutch pedal, a ratchet member telescoping said tubular member and having a yoke adapted to engage the steering wheel rim, a spring-controlled member of approximately triangular formation fulcrumed upon and receiving said tubular member, and a frame adapted to form the fulcrum of said spring-controlled member and carried by tubular formations on the latter, and engaging said ratchet member.

4. An automobile repair tool, comprising a tubular member having a non-slipping end adapted to engage a brake or clutch pedal, a ratchet telescoping said tubular member and provided with a yoke at one end adapted to engage the steering wheel, a triangular spring-controlled tubular member having the aforesaid tubular member passing therethrough and fulcrumed upon the spring-controlled tubular member, and a frame adapted to engage said ratchet at one end and carried by said triangular member.

5. An automobile repair tool, including a tubular member adapted to engage a brake or clutch pedal, a ratchet telescoping said tubular member and provided with a yoke at one end adapted to engage the steering wheel rim, a triangular spring-controlled member adapted to receive said tubular member and fulcrumed upon said tubular member, and a pawl-forming frame having one end engaging said ratchet and its lateral portions received by tubular formations of said triangular spring-controlled member, the opposite end of said pawl-forming frame forming the fulcruming connection between said spring-controlled triangular member and said tubular member.

In testimony whereof I affix my signature in presence of two witnesses.

FRANK W. JACKSON.

Witnesses:
WILLIAM L. McADAM,
HAROLD GEORGE BOYD.